United States Patent [19]

Sankey

[11] 4,037,894
[45] July 26, 1977

[54] FRAME CONSTRUCTION FOR POWER SHOVELS AND THE LIKE

[75] Inventor: Edwin W. Sankey, Marion, Ohio

[73] Assignee: Marion Power Shovel Company, Inc., Marion, Ohio

[21] Appl. No.: 661,818

[22] Filed: Feb. 26, 1976

[51] Int. Cl.² .......................................... F16C 19/04
[52] U.S. Cl. ..................................... 308/227; 212/69
[58] Field of Search ............... 308/227, 178, 182, 230; 212/69, 66, 67, 68; 74/413, 467

[56] References Cited

U.S. PATENT DOCUMENTS

| 2,458,271 | 1/1949 | Hustow | 212/69 |
| 2,472,726 | 6/1949 | Russell | 212/69 |
| 2,739,716 | 3/1956 | Poulter | 212/69 |

Primary Examiner—Joseph F. Peters, Jr.
Assistant Examiner—Gene A. Church
Attorney, Agent, or Firm—Mason, Fenwick & Lawrence

[57] ABSTRACT

In a machine having an upper moveable frame, a frame for supporting the upper moveable frame including a rigid grid structure, an upper plate disposed on and rigidly secured to the grid structure and a pad for supporting the upper moveable frame, such support pad being disposed unattached to the grid structure and rigidly attached to the upper plate.

10 Claims, 6 Drawing Figures

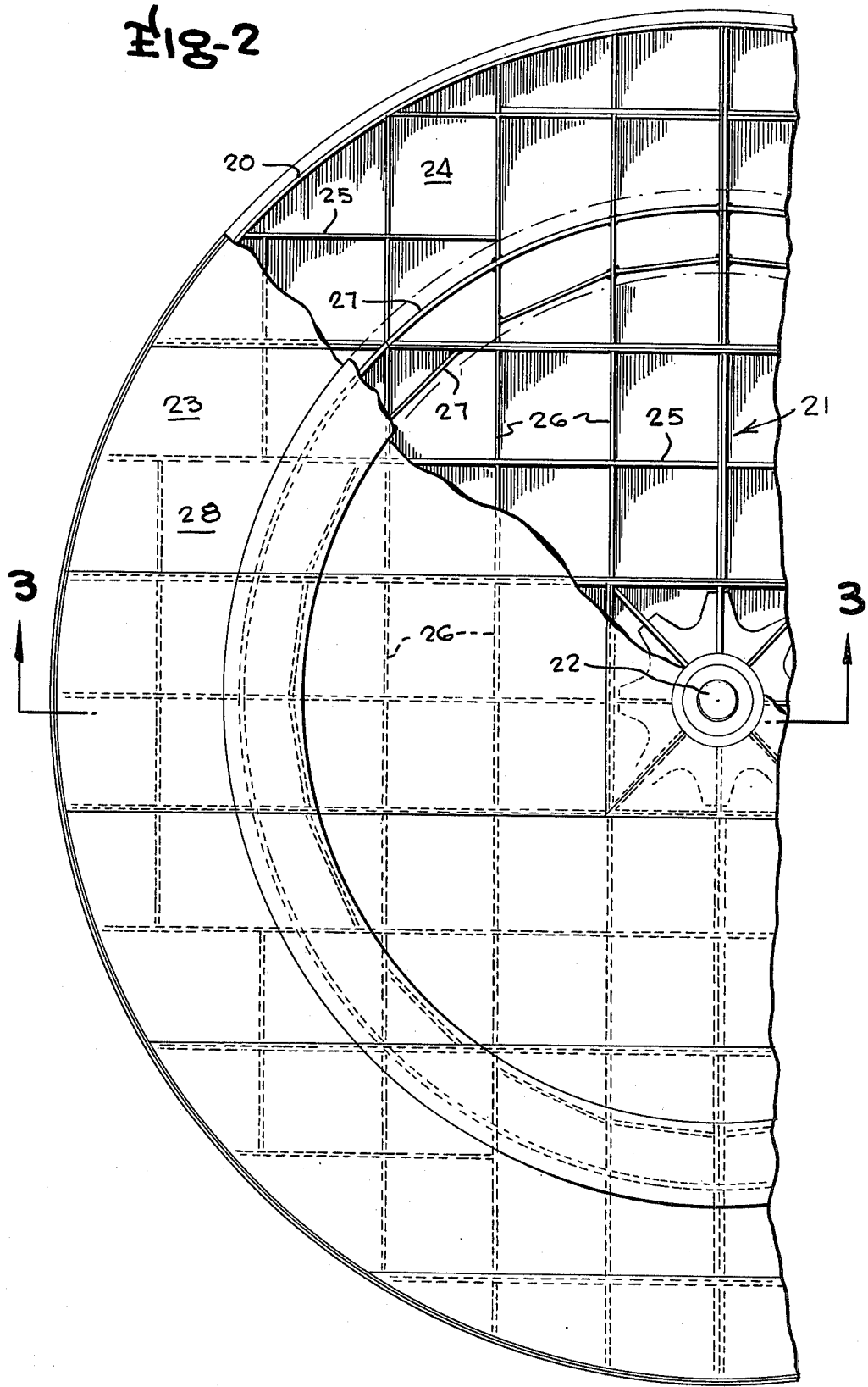

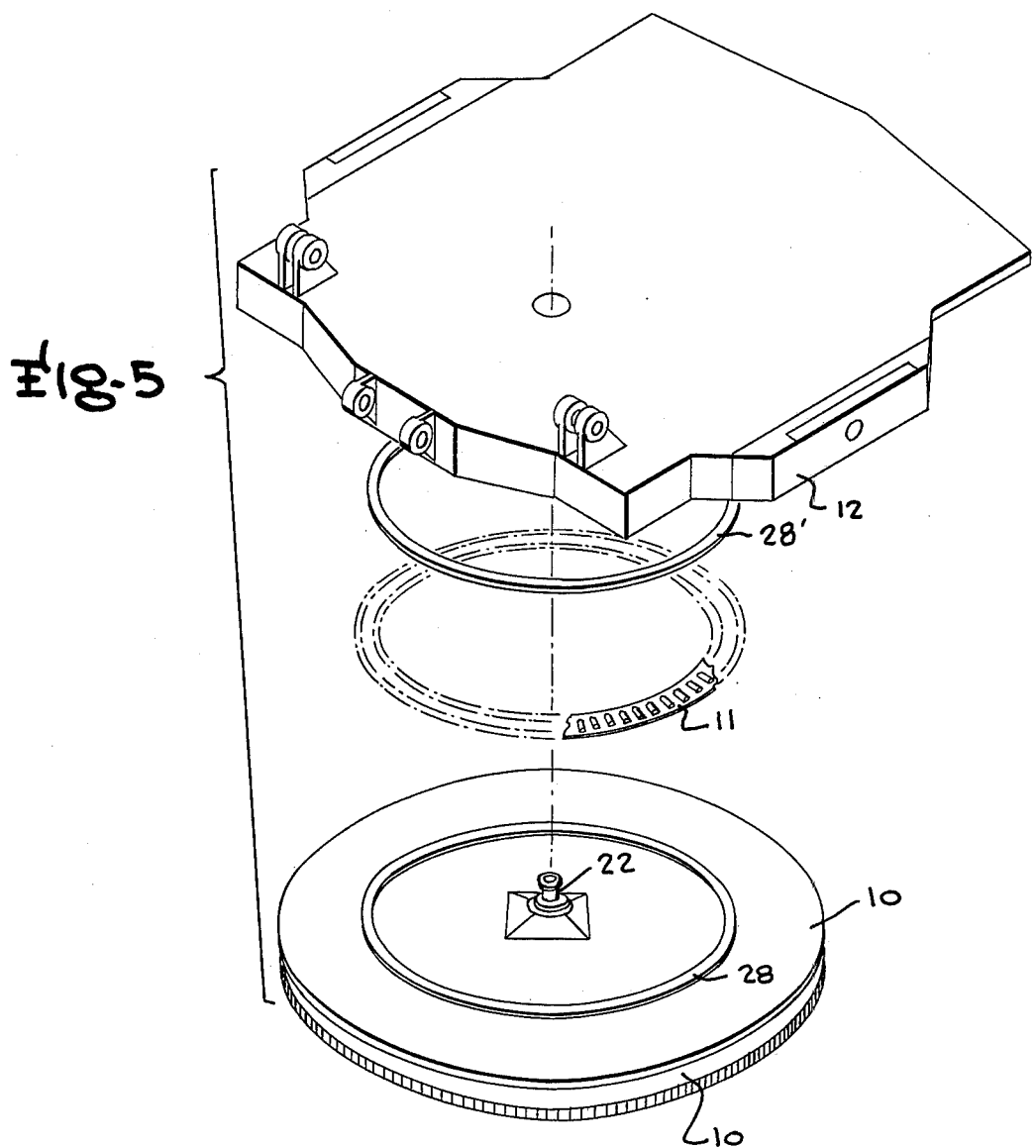
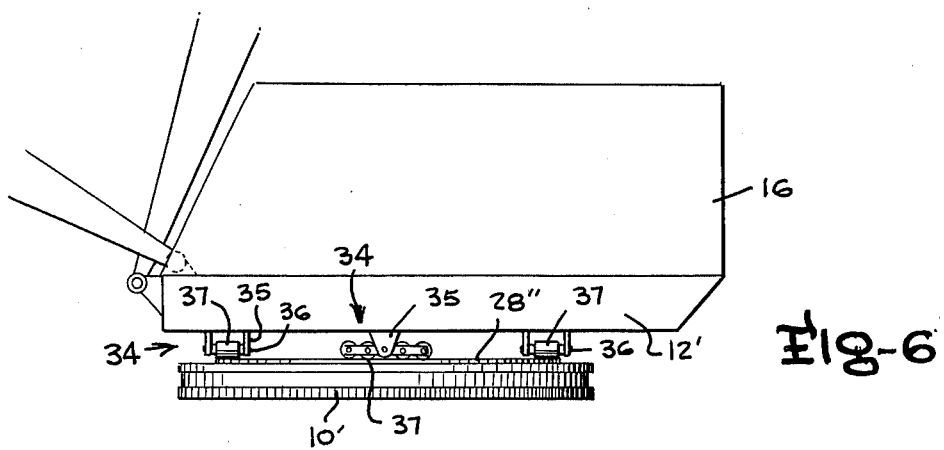

FRAME CONSTRUCTION FOR POWER SHOVELS AND THE LIKE

This invention relates to a frame construction and more particularly to a frame construction suitable for use in power shovels and the like. This invention further contemplates a novel pad construction for mounting the roller circle system or truck system for use in mounting such as draglines, stripping shovels, loading shovels, cranes, drills and the like.

Generally, dragline machines in the prior art have consisted of a lower frame or "tub" adapted to be seated on the ground, a "live" roller circle mounted on the lower frame, an upper frame mounted on the roller circle for swing movement relative to the lower frame, a boom mounted on the front end of the upper frame supporting a dragline bucket, a gantry and possibly a mast mounted on the upper frame for supporting the boom by means of pendants, and machinery mounted on the upper frame for operating the dragline bucket, swinging the upper frame and propelling the machine.

Traditionally, the lower frame or tub of conventional draglines has consisted of an annular outer wall, a grid structure disposed within the outer wall, including a plurality of longitudinally and transversely disposed frame members welded together and to the outer wall, a central journal mounted on the grid structure, and upper and lower plates welded to the grid structure. The upper plate is interrupted about a circular path for seating a lower pad of the roller circle which is welded along its inner and outer edges to the upper plate and along its bottom surface to the grid structure. In addition to the lower pad rigidly secured to the lower frame, the roller circle includes a set of rails and rollers disposed on the lower pad and an upper pad seated on the upper rails and rigidly secured to the upper frame of the machine.

In the construction of the lower frames or tubs of draglines, it has been the conventional practice to use heavy welds to form the grid structure and secure the upper and lower plates and lower roller circle pad to the grid structure. Such heavy welds result in high residual stresses in the components of the tubs which stresses can be made critical by defects in the welds or welded steel components, such as welding notches in the welded components, unfused roots or slag inclusions in the welds and lamellar tears in the welded steel components. Fatigue loads applied to such machines during normal service operations, can aggravate such critically stressed areas, resulting in cracks and ultimately in component failure. It thus has been found to be desirable to provide a lower frame or tub construction for a dragline which will reduce the number of critically stressed areas vulnerable to cracking under normal fatigue conditions.

Accordingly, it is the principal object of the present invention to provide an improved frame construction.

Another object of the present invention is to provide an improved frame construction suitable for rotatably supporting an upper frame construction such as in a dragline machine and the like.

A further object of the present invention is to provide an improved frame construction suitable for rotatably supporting an upper frame in a dragline machine and the like, in which critical stress areas subject to fatigue loads, are reduced.

A still further object of the present invention is to provide an improved, welded lower frame or tub for a dragline in which critical stress areas produced by heavy welds, subject to fatigue loading, is substantially reduced.

Another object of the present invention is to provide an improved, welded lower frame or tub for a dragline, in which critical residual stresses in the vicinity of the lower roller circle pad, produced by heavy welds, subject to fatigue loading, are greatly reduced.

A further object of the present invention is to provide a novel live roller circle for a machine having a rotatable upper frame, such as a dragline, stripping shovels, loading shovel, crane, drill and the like.

A still further object of the present invention is to provide a novel truck system for a machine having a rotatable upper frame.

Other objects and advantages of the present invention will become more apparent to those persons having ordinary skill in the art to which the present invention pertains, from the following description taken in conjuntion with the accmompanying drawings, wherein:

FIG. 2 is an enlarged cross-sectional view taken along line 2—2 in FIG. 1, having portions thereof broken away;

FIG. 5 is an exploded perspective view of a live roller circle for supporting the upper frame; and FIG. 6 is a side elevational view of a dragline machine, similar to FIG. 1, including a truck system for rotatably supporting the upper frame.

Figure 1:
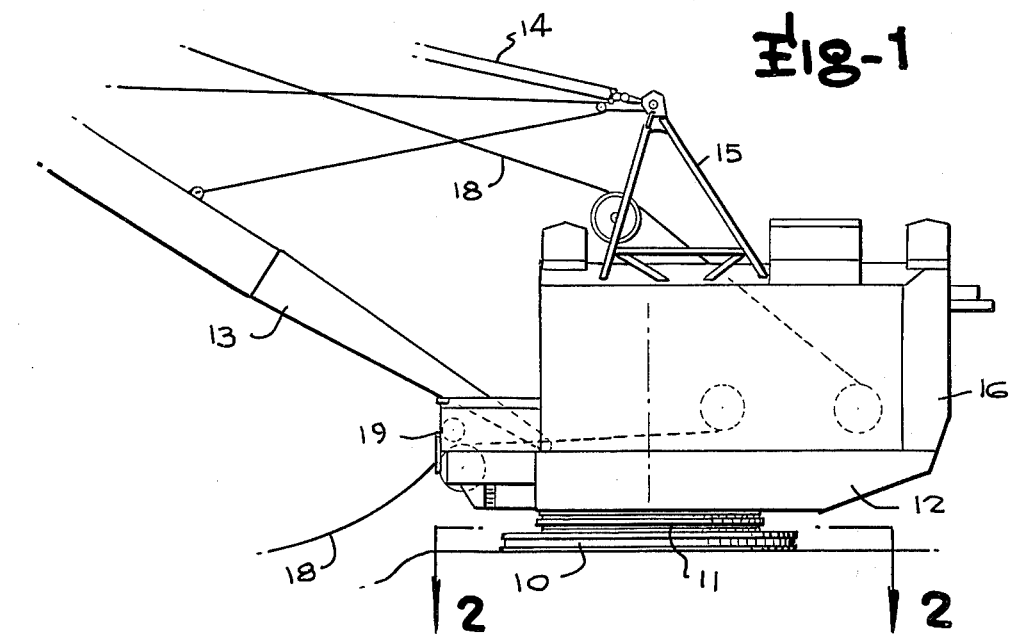
FIG. 1 is a side elevational view of a dragline machine, embodying the present invention, having portions thereof broken away.

Referring to FIG. 1 of the drawings, there is illustrated a dragline machine generally including a lower frame or tub 10, a live roller circle 11 mounted on the tub and an upper frame 12 mounted on the roller circle. Connected to the front end of the upper frame is a boom 13 which is supported at its outer end or point by pendants 14 secured to the upper end of a gantry 15. The gantry is mounted on upper frame 12 and is partially enclosed in a housing 16. Also disposed within housing 16 and supported on upper frame 12 is drag and hoist machinery 17 which operates a dragline 18 supported at the point of the boom and having connected thereto a conventional dragline bucket. Also mounted on the upper frame are conventional swing and propel machinery, and an operators station 19 equipped with suitable controls for operating the dragline bucket, swinging the upper frame and propelling the machine.

Figure 3:
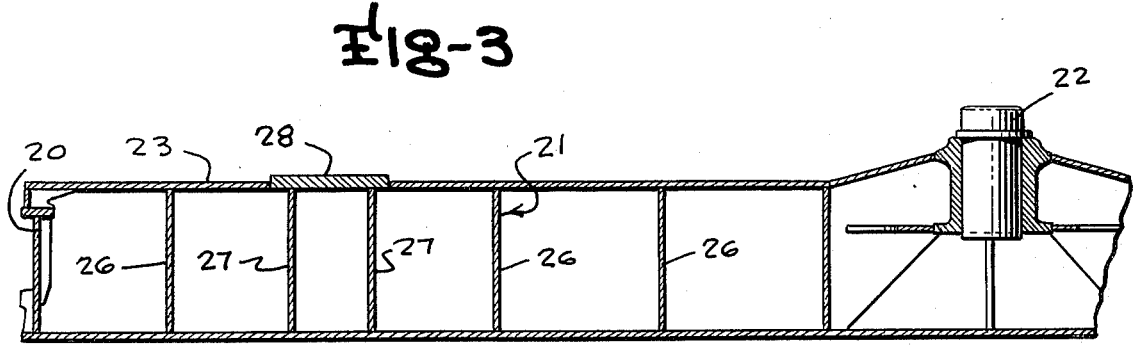
FIG. 3 is a cross-sectional view taken along line 3—3 in FIG. 2.

As best illustrated in FIGS. 2 and 3, the lower frame or tub consists of an annular side wall 20, a grid structure 21 rigidly secured to annular wall 20, a center journal 22 mounted on grid structure 21 and upper and lower plates 23 and 24 rigidly secured to the grid structure. As best shown in FIG. 2, grid structure 21 consists of a plurality of transversely disposed bulkheads 25 rigidly secured at their ends to annular wall 20, longitudinally disposed, vertical ribs 26 rigidly interconnecting the bulkheads, and arcuate, vertical ribs 27 rigidly interconnecting the transverse bulkheads and longitudinal ribs and disposed concentrically relative to the center journal to form a circular path or pad for mounting the lower rail of the roller circle. Annular wall 20, bulkheads 25 and vertical ribs 26 and 27 are formed of steel and are rigidly secured together by heavy welds. Upper and lower plates 23 and 24 are formed of heavy plate steel and also are secured to the upper and lower ends of annular wall 20, bulkheads 25 and vertical ribs 26 and 27 by heavy welds.

Figure 4:
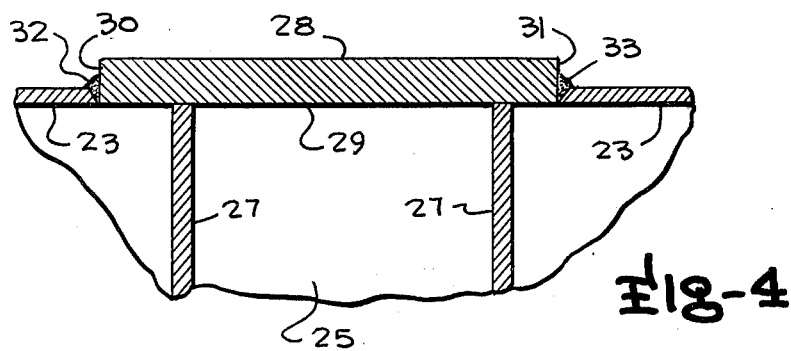
FIG. 4 is an enlarged, vertical cross-sectional view of a portion of the frame structure shown in FIG. 2 and 3.

Although not illustrated in detail, roller circle 11 includes a lower pad 28 secured to lower frame 10, a set of rollers and rails mounted on lower pad 28 and an upper rail 28' seated on a set of rollers and rails and rigidly secured to upper frame 12. Lower pad 28 consists of a plurality of arcuate segments disposed in end to end relation, seated on grid structure 21 concentric with the center journal. Referring to FIG. 4, it will be noted that each segment of lower pad 28 includes a bottom surface 29 seated, unattached, to bulkheads 25 and vertical ribs 26 and 27, and inner and outer edges 30 and 31 secured by welds 32 and 33 to upper plate 23.

By refraining from welding lower roller circle pad 28 to bulkheads 25 and vertical ribs 26 and 27, residual stresses normally produced by heavy welding of such members, are avoided entirely. Defects caused by welding, which have the effect of developing stress concentrations, also are avoided. Consequently, the formation or enlargement of cracks in the members is prevented thus resulting in a substantially higher fatigue failure resistence of the members.

While it has been the conventional practice in the industry to weld the lower roller circle pad to the bulkheads and vertical ribs of the lower frame, such an attachment is not a structural design necessity in that the joints between the pad, and the bulkheads and vertical ribs are subjected principally only to compressive loads which can be carried without the requirement of welding such components.

Although the embodiment disclosed in the drawings and described herein relates to a machine equipped with a roller circle on which the upper frame of the machine is supported, it is to be understood that the invention is equally applicable to a machine equipped with a truck system as shown in FIG. 6 for supporting the upper frame of the machine. More specifically, such a machine would include a lower frame 10' comparable to lower frame 10 shown in the drawings, a set of truck units 34 and rails supported on a pad 28' comparable to pad 28 which would be seated on the grid structure of the lower frame, unattached, and an upper frame 12', comparable to frame 12, mounted on the truck units. The truck units may be of any conventional design which would consist of a frame or chassis 35 rigidly secured to the upper frame 12', one or more axles 36 journalled in the chassis and a set of wheels 37 mounted on each axle.

From the foregoing detailed description, it will be evident that there are a number of changes, adaptions and modifications of the present invention which come within the province of those persons having ordinary skill in the art to which the present invention pertains. However, it is intended that all such variations not departing from the spirit of the present invention be considered as within the scope thereof, as limited solely by the appended claims.

I claim:

1. In a machine having an upper moveable frame, a support frame for supporting said upper moveable frame comprising a rigid grid structure, an upper plate disposed on and rigidly secured to said grid structure and a pad for supporting said upper moveable frame, said support pad being disposed unattached on said grid structure and rigidly attached to said upper plate.

2. A support frame according to claim 1 wherein said upper plate is welded to said grid structure and said support pad is welded to said upper plate.

3. A support frame according to claim 1 wherein said grid structure includes at least one vertical rib on which said support pad is disposed.

4. A support frame according to claim 3 wherein said support pad is provided with a bottom surface seated on said vertical rib, and side edges welded to said upper plate.

5. In a machine having a lower frame including a grid structure and an upper plate rigidly secured to said grid structure, and an upper frame rotatable relative to said lower frame, a live roller circle comprising a lower annular support pad disposed unattached on said grid structure and rigidly attached to the upper plate of said lower frame, a plurality of rollers disposed on said lower pad, and an upper pad disposed on said rollers and rigidly attached to said upper frame.

6. A live roller circle according to claim 5 wherein said lower support pad is welded to the upper plate of said lower frame.

7. A live roller circle according to claim 5 wherein said lower support pad is provided with a bottom surface seated on vertical rib members of said rigid grid structure, and side edges welded to the upper plate of said lower frame.

8. In a machine having a lower frame including a grid structure and an upper plate rigidly secured to said grid structure, and an upper frame rotatable relative to said lower frame, a truck system comprising a lower annular support pad disposed unattached on said grid structure and rigidly attached to the upper plate of said lower frame, and a plurality of circumferentially spaced, wheeled truck units, mounted on said lower support pad for travel therealong and rigidly attached to said upper frame.

9. A truck system according to claim 8 wherein said lower support pad is welded to the upper plate of said lower frame.

10. A truck system according to claim 8 wherein said lower support pad is provided with a bottom surface seated on vertical rib members of said rigid grid structure, and side edges welded to the upper plate of said lower frame.

* * * * *